(12) United States Patent
Shao et al.

(10) Patent No.: US 12,482,258 B2
(45) Date of Patent: Nov. 25, 2025

(54) FEW-SHOT URBAN REMOTE SENSING IMAGE INFORMATION EXTRACTION METHOD BASED ON META LEARNING AND ATTENTION

(71) Applicant: Wuhan University, Wuhan (CN)

(72) Inventors: Zhenfeng Shao, Wuhan (CN); Qingwei Zhuang, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 392 days.

(21) Appl. No.: 18/090,549

(22) Filed: Dec. 29, 2022

(65) Prior Publication Data

US 2023/0215166 A1 Jul. 6, 2023

(30) Foreign Application Priority Data

Dec. 30, 2021 (CN) .......................... 202111654351.0

(51) Int. Cl.
*G06V 20/10* (2022.01)
*G06V 10/82* (2022.01)

(52) U.S. Cl.
CPC ............ *G06V 20/176* (2022.01); *G06V 10/82* (2022.01)

(58) Field of Classification Search
CPC .... G06V 10/454; G06V 10/803; G06V 10/82; G06V 20/13; G06V 20/176; G06V 20/194; Y02T 10/40
See application file for complete search history.

(56) References Cited

U.S. PATENT DOCUMENTS

2020/0218901 A1*  7/2020  Elder .................... G06V 20/46

FOREIGN PATENT DOCUMENTS

CN       113033403 A  *  6/2021

OTHER PUBLICATIONS

Yuan, Zhengwu, et al. "Few-shot scene classification with multi-attention deepemd network in remote sensing." IEEE Access 9 (2020): 19891-19901. (Year: 2020).*

* cited by examiner

*Primary Examiner* — Michael J Vanchy, Jr.
(74) *Attorney, Agent, or Firm* — MATTHIAS SCHOLL P.C.; Matthias Scholl

(57) ABSTRACT

A few-shot urban remote sensing image information extraction method based on meta learning and attention includes building a few-shot urban remote sensing information pre-trained model. During a pre-training stage, pre-training network learning is performed for a few-shot set to fully learn feature information of existing samples and obtain initial feature parameters and a deep convolutional network backbone of the few-shot set; the few-shot urban remote sensing information pre-trained model is a network structure including a convolutional layer, a pooling layer and a fully-connected layer, and includes five sections of convolutional network where each section includes two or three convolutional layers, and an end of each section is connected to one maximum pooling layer to reduce a size of a picture; the number of convolutional kernels inside each section is same, and when closer to the fully-connected layer, the number of convolutional kernels is larger.

5 Claims, 3 Drawing Sheets

FEW-SHOT URBAN REMOTE SENSING IMAGE INFORMATION EXTRACTION METHOD BASED ON META LEARNING AND ATTENTION

CROSS-REFERENCE TO RELATED APPLICATIONS

Pursuant to 35 U.S.C. § 119 and the Paris Convention Treaty, this application claims foreign priority to Chinese Patent Application No. 202111654351.0 filed Dec. 30, 2021, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure belongs to the field of remote sensing image information extraction and relates to a few-shot urban remote sensing image information extraction method based on synergy mechanism of meta learning and attention.

As important places for human being to live with activities and productions, cities, along with rapid development of urbanization, suffer many "urban diseases" such as ecological function degradation, environmental pollution and extreme meteorological events, which seriously threaten their sustained development. Along with rapid development of remote sensing technologies, particularly the home-made remote sensing satellite technologies, China has the autonomous capability to obtain global urban high-resolution geographical information. Due to influence of intelligent decoding level of remote sensing images and complex urban scenarios, it is still a huge challenge to perform urban ground feature extraction for high resolution remote sensing images.

Deep learning network has strong non-linear representation ability and high image recognition ability and thus has significant advantages in high resolution image information extraction. But, deep learning algorithm usually needs many parameters and large-scale image knowledge library. Limited by geological regions and weather and other factors, it is a difficult and high-cost job to perform large-scope and large-quantity training sample labeling. For some few-shot urban regions, deep learning algorithm is liable to the problem of weak generalization ability, which is unfavorable for obtaining accurate urban remote sensing information.

SUMMARY

For the shortcomings of the existing few-shot urban remote sensing image information extraction technology, the disclosure aims to provide a new few-shot remote sensing information extraction model based on synergy mechanism of meta learning and attention.

The technical solution of the disclosure provides a few-shot urban remote sensing image information extraction method based on meta learning and attention, which comprises the following steps:

step 1, building a few-shot urban remote sensing information pre-trained model, wherein during a pre-training stage, pre-training network learning is performed for a few-shot set to fully learn feature information of existing samples and obtain initial feature parameters and a deep convolutional network backbone of the few-shot set; the few-shot urban remote sensing information pre-trained model is a network structure comprising a convolutional layer, a pooling layer and a fully-connected layer, and comprises five sections of convolutional network where each section comprises three convolutional layers, and an end of each section is connected to one maximum pooling layer to reduce a size of a picture; the number of convolutional kernels inside each section is same, and when closer to the fully-connected layer, the number of convolutional kernels is larger;

step 2, constructing a "time-space-spectrum-angle" attention model to enable the network to focus on important "time-space-spectrum-angle" information in a training process, suppress noise and redundant information, and improve classification performance of the model;

step 3, establishing a synergy mechanism of meta learning and attention and realizing few-shot urban remote sensing information extraction, comprising performing parallel association learning for feature parameters obtained by the "time-space-spectrum-angle" attention model and initial feature parameters and introducing a regularizer to minimize cross entropy and structural risk and realize full digging for the few-shot information;

step 4, obtaining remote sensing data through a satellite and fusing a full color image and a multi-spectral image to obtain a multi-spectral image, and using a method designed using the above three steps to perform urban ground feature information extraction.

The convolutional network in the few-shot urban remote sensing information pre-trained model is implemented as follows:

a first section of convolutional network consists of two convolutional layers and one maximum pooling layer, with an output channel number being 64 and an output size being 112×112×64;

a second section of convolutional network consists of two convolutional layers and one maximum pooling layer, with an output channel number being 128 and an output size being 56×56×128;

a third section of convolutional network consists of three convolutional layers and one maximum pooling layer, with an output channel number being 256 and an output size being 28×28×256;

a fourth section of convolutional network consists of three convolutional layers and one maximum pooling layer, with an output channel number being 512 and an output size being 14×14×512;

a fifth section of convolutional network consists of three convolutional layers and one maximum pooling layer, with an output channel number being 512 and an output size being 7×7×512;

wherein results output by the fifth convolutional network are represented as one-dimensional vector in a flattened manner and then input into a Dropout layer corresponding to a first fully-connected layer and then input into a Dropout layer corresponding to a second fully-connected layer and finally input into a third fully-connected layer, wherein an output node of the third fully-connected layer is 1000 and obtains a classification output probability and a classification result by using softmax function at the same time.

In the "time-space-spectrum-angle" attention model, for a three-dimensional input X, two feature-compressed global feature descriptions are obtained firstly through maximum pooling and average pooling along a channel dimension;

then, by a gate mechanism of hard-sigmoid, a weight $X_{SS} \in (0,1)$ of a temporal feature, a spatial feature, a spectral feature and an angular feature is obtained; finally, the original input X is multiplied by the weight $X_{SS}$;

continuous learning is performed by the network in a training process, and a weight corresponding to the important "time-space-spectrum-angle" information approaches 1; and a weight corresponding to non-important or negative noise and redundant information approaches 0.

The "time-space-spectrum-angle" feature vector is obtained in the following formula:

$$k'_i \Leftarrow k_i - \eta \nabla k_i$$

$$\nabla k_i = \frac{\sum_{j=1}^{n} 1[y=i](k_i - e_{j,l})}{\text{sum}(1[y=i])}$$

$$v_i \Leftarrow \frac{v_i - \eta \nabla v_i}{\sum_{j=1}^{C}(v_{i,j} - \eta \nabla v_{i,j})}$$

$$\nabla v_i = \frac{\sum_{j=1}^{n} 1[y=i](v_i - p_{j,l})}{\text{sum}(1[y=i])}$$

wherein $k'_i$ represents a final category feature center of an i-th category, $k_i$ represents an initial category feature center of the i-th category, $\nabla$ represents a gradient, $\nabla k_i$ represents a gradient-optimized category feature center of the i-th category, j represents a number of unlabeled samples, l represents a number of labeled samples, $e_{j,l}$ represents a feature corresponding to the labeled samples and the unlabeled samples, sum ( ) represents a sum of values in parentheses, $v_i$ represents a probability distribution feature center of the i-th category, $v_{i,j}$ represents probability distribution feature centers of the i-th category obtained by updating category probability vectors of j samples of the i-th category, n represents a total number of samples, C represents a number of categories in a dataset, e represents an initial feature vector, p represents a "time-space-spectrum-angle" feature vector, $P_{j,l}$ represents a prediction probability corresponding to the labeled samples of the l-th category and the unlabeled samples of the j-th category, η represents an update coefficient, and 1 (y=i) represents an indicator function.

The disclosure addresses the problem of weak generalization ability of the existing remote sensing image information extraction method and can obtain more accurate information extraction effect based on synergy mechanism of meta learning and attention.

Compared with the existing methods, the disclosure has the following advantages and positive effects: the existing remote sensing image information extraction method based on convolutional neural network needs to be supported by a large number of samples; when the number of the samples is insufficient, it is easy to bring weak generalization ability and it is difficult to satisfy intelligent extraction requirements for few-shot urban ground feature information. The advantage of the disclosure is that the extraction accuracy of the few-shot urban typical ground feature information is increased by establishing synergy mechanism of meta learning and attention.

BRIEF DESCRIPTIONS OF THE DRAWINGS

DETAILED DESCRIPTIONS OF EMBODIMENTS

In order to help those of ordinary skills to understand and carry out the disclosure, the disclosure will be further described below in combination with the drawings and specific embodiments. It should be understood that the embodiments described herein are used only to describe and interpret the disclosure rather than limit the disclosure.

In view of the above, the disclosure provides a few-shot urban high-resolution remote sensing information extraction method based on synergy mechanism of meta learning and attention to perform parallel association learning for feature parameters obtained by a "time-space-spectrum-angle" attention model and initial feature parameters so as to obtain optimized feature parameters and realize full digging for few-shot information and obtain urban typical element information in a few-shot urban high-resolution remote sensing image.

The environment used by the embodiments of the disclosure is as follows: the CPU of the server is Intel Xeon E5-2665, GPU is NVIDIA GTX1080Ti, operating system is Ubuntu 16.04, compiling environment is PyTorch 1.1.0, Python 3.5, CUDA9.0 and CUDNN7.1.

Figure 1:
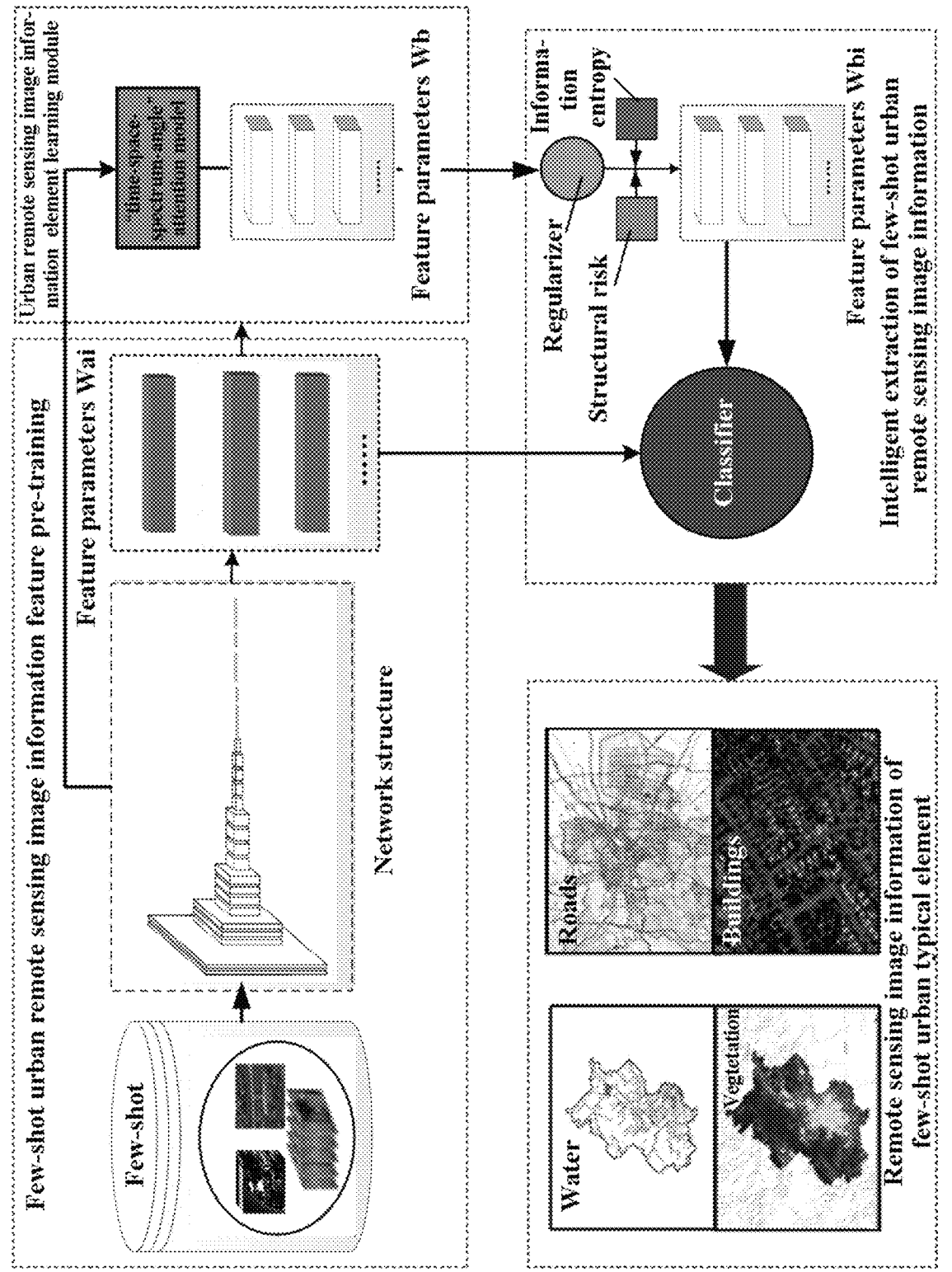
FIG. 1 is a structural diagram of a few-shot urban high-resolution remote sensing image information extraction according to an embodiment of the disclosure.

An embodiment of the disclosure is remote sensing image information extraction, a flow of which may be referred to FIG. 1. A few-shot urban remote sensing image information extraction method based on meta learning and attention according to an embodiment of the disclosure comprises the following steps.

Step 1, a few-shot urban remote sensing information pre-trained model is built.

Few-shot learning is proposed based on the fact that some cities in the world only have a small number of samples. A model of a potential problem to be addressed is pre-trained using a small number of samples. Therefore, the pre-trained model designing and how to train the model are very important. The parameters of most models are initialized randomly at the start of training such that the models need to train a large number of parameters to achieve a better result. However, most of the parameters in the few-shot extraction model belong to feature extraction part. Weight parameters of the feature extraction part of the model is obtained by pre-training a classifier model and then applied to a subsequent meta learning model. In this case, parameter learning can be performed for the few-shot information extraction during training without considering the learning of the feature extraction part.

Figure 2:
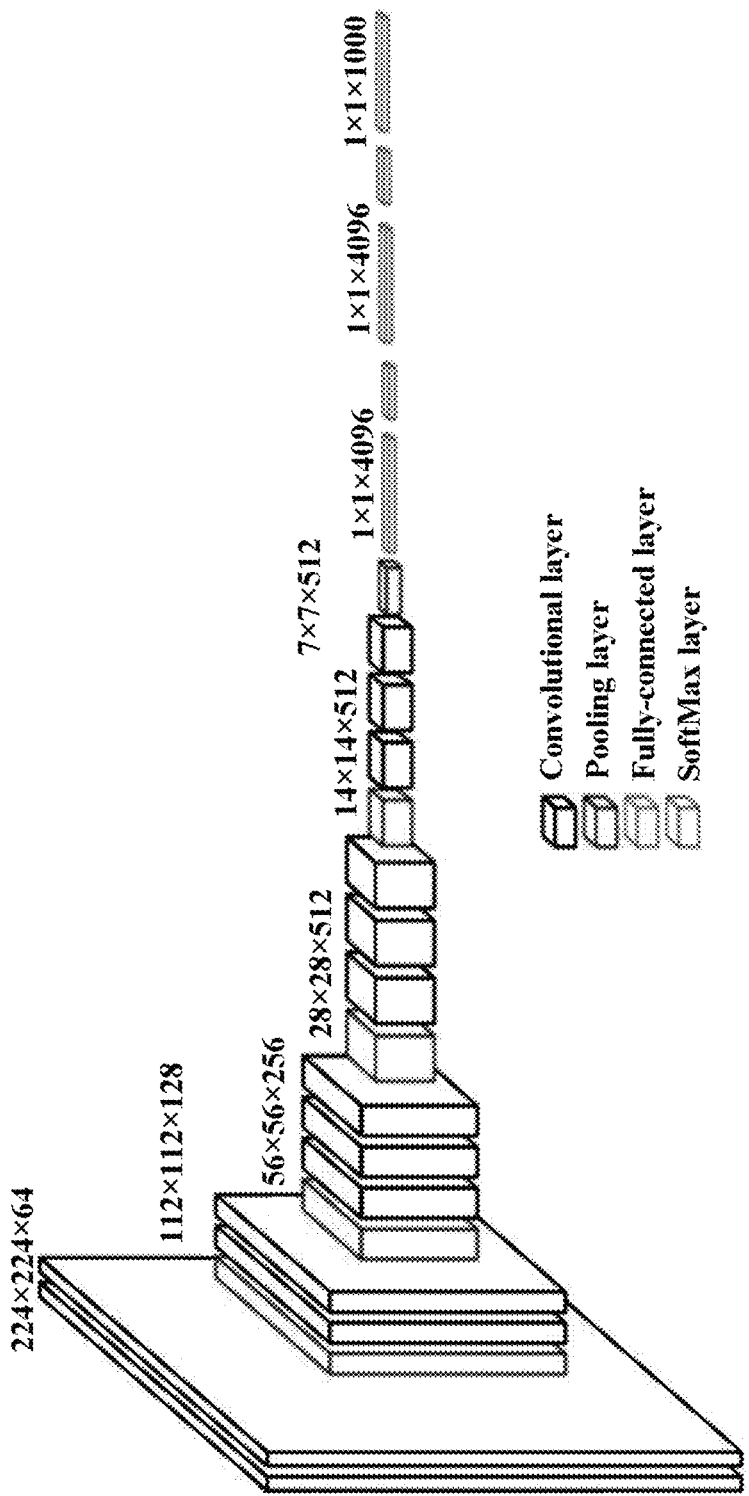
FIG. 2 is a network structure schematic diagram which is a partially-enlarged diagram of a corresponding part in FIG. 1 according to an embodiment of the disclosure.

FIG. 2 is a network structure comprising a convolutional layer, a pooling layer and a fully-connected layer according to an embodiment of the present disclosure. The network structure comprises five sections of convolutional network, where each section comprises two or three convolutional layers, and an end of each section is connected to one maximum pooling layer to reduce a size of a picture; the number of convolutional kernels inside each section is same, and when closer to the fully-connected layer, the number of convolutional kernels is larger. The specific implementation is carried out in the following preferred manner.

A first section of convolutional network consists of two convolutional layers and one maximum pooling layer. The convolutional kernels of the two convolutional layers have a size of 3×3 with the number of the convolutional kernels being 64 and the step length being 1×1, and full pixel scanning (the two concatenated 3×3 convolutional layers are equivalent to one 5×5 convolutional layer. But, the reason why the two 3×3 convolutional layers is not directly replaced with the 5×5 convolutional layer is that two 3×3 convolutional layers has more nonlinear operations than one 5×5 convolutional layer and thus has stronger learning capability for images). The maximum pooling layer has a pooling size of 2×2, with the step length being 2×2, the output channel number being 64, and the output size being 112×112×64.

Similar to the first section of convolutional network, a second section of convolutional network also consists of two convolutional layers and one maximum pooling layer, with a difference being in that the output channel number is 128 and the output size is 56×56×128.

A third section of convolutional network consists of three convolutional layers and one maximum pooling layer. The three convolutional layers and the maximum pooling layer can be implemented in a manner similar to the implementation manner of the convolutional layers and pooling layers in the first and second sections of convolutional network, with a difference being in that the output channel number is 256 and the output size is 28×28×256.

Similar to the third section of convolutional network, a fourth section of convolutional network also consists of three convolutional layers and one maximum pooling layer with only difference being in that the output channel number is 512 and the output size is 14×14×512.

Same as the fourth section of convolutional network, a fifth section of convolutional network also consists of three convolutional layers and one maximum pooling layer with the output channel number being 512 and the output size being 7×7×512.

A result output by the fifth section of convolutional network is flattened, that is, 7×7×512 is represented as one-dimensional vector of 25088(7×7×512=25088); then, the result is input into a first fully-connected layer and the output node being 4096, activation function being ReLu and a Dropout layer established, and during training, a node retention rate is 0.5 while a predicted node retention rate being 1; then, the result is input into a second fully-connected layer, where the second fully-connected layer is also closely followed by a Dropout layer like the first fully-connected layer; finally, the result is input into a third fully-connected layer where an output node of the third fully-connected layer is 1000 and obtains a classification output probability and a classification result by using softmax function at the same time.

The advantage of the network structure is that few-shot feature information can be fully dug to avoid excessive reliance on large sample quantity. Each section of convolution of the network structure has a definite task and can be combined with meta learning to perform task each time so as to enable the model to obtain useful experiences. Given a new task, with assistance of accumulated experiences, the model can continue learning an extremely small number of samples of the new task so as to quickly adapt to and master the new task, thereby realizing intelligent extraction of urban typical ground feature information with a small number of samples involved.

Firstly, model parameters are initialized, and a parameter of the feature extraction part is defined as $\Theta$ which represents a parameter of the convolutional layer; a parameter of the classifier is defined as $\theta$ which represents a parameter of the fully-connected layer. Afterwards, all data in a training set D are used to train a classifier model, and the parameters are optimized using gradient descent method. The calculation formula is shown below:

$$[\Theta;\theta]=[\Theta;\theta]-\eta\nabla f([\Theta;\theta]) \quad (1)$$

where [$\Theta$; $\theta$] represent feature extraction parameters and classifier parameters respectively, $\nabla$ represents a gradient, $\eta$ represents a learning rate, and f ([$\Theta$; $\theta$]) represents a convex function.

Through optimization, the model learns the feature extraction parameter $\Theta$ in this part, and the parameter will be stored for use in a meta learning process of the next part. But the parameter $\theta$ for classification will be rejected.

In a pre-training stage, pre-training network learning is performed for the few-shot set to fully learn feature information of existing samples and obtain initial feature parameters and a deep convolutional network backbone of the few-shot set.

Step 2, a "time-space-spectrum-angle" attention model is built.

Enlightened by the attention mechanism in the computer vision, a "time-space-spectrum-angle" attention model is built in the disclosure, such that the network focuses on important "time-space-spectrum-angle" information, and suppresses noise and redundant information in training process, so as to improve the classification performance of the model. In the "time-space-spectrum-angle" attention model, for a three-dimensional input X, two feature-compressed global feature descriptions are obtained firstly through maximum pooling and average pooling along a channel dimension; then, by a gate mechanism of hard-sigmoid, a weight $X_{SS} \in (0,1)$ of a temporal feature, a spatial feature, a spectral feature and an angular feature is obtained. Continuous learning is performed by the network in a training process, and a weight corresponding to the important "time-space-spectrum-angle" information approaches 1; and a weight corresponding to non-important or negative noise and redundant information approaches 0. Finally, the original input X is multiplied by the weight $X_{SS}$. The process formula is as shown below:

$$Y_{SS}=F_{scale}(\sigma(f^{3\times3\times3}[F_{max},F_{avg}],X)) \quad (2)$$

wherein $F_{max}$ and $F_{avg}$ represent a maximum pooling and an average pooling along a channel direction respectively; $f^{3\times3\times3}$ ( ) is an ordinary 3×3×3 convolution, $F_{scale}$( ) represents element-by-element multiplication of the original inputs and the weights, $\sigma$( ) is a hard-sigmoid activation function. Compared with sigmoid function, $\sigma$( ) has a higher computing efficiency. The calculation formula is as shown below:

$$\text{hard-sigmoid} = \max\left(0, \min\left(1, \frac{2x+5}{10}\right)\right) \quad (4)$$

wherein x represents a stimulation received by an input neuron of a neural network, min( ) represents the output value is the minimum value in the parentheses, and max( ) represents the output value is the maximum value in the parentheses.

Step 3, by establishing synergy mechanism of meta learning and attention, few-shot urban remote sensing information extraction is realized.

In the disclosure, based on the idea of meta learning, parallel association learning is performed for the feature parameters obtained by the "time-space-spectrum-angle"

attention model and initial feature parameters to obtain optimized feature parameters, so as to realize full digging for few-shot information.

In the disclosure, based on attention mechanism, a "time-space-spectrum-angle" feature vector $W_b$ is obtained. The feature vector $W_b$ is calculated in the following formula:

$$k'_i \Leftarrow k_i - \eta \nabla k_i \quad (5)$$

$$\nabla k_i = \frac{\sum_{j=1}^{n} 1[y=i](k_i - e_{j,l})}{\text{sum}(1[y=i])} \quad (6)$$

$$v_i \Leftarrow \frac{v_i - \eta \nabla v_i}{\sum_{j=1}^{C}(v_{i,j} - \eta \nabla v_{i,j})} \quad (7)$$

$$\nabla v_i = \frac{\sum_{j=1}^{n} 1[y=i](v_i - p_{j,l})}{\text{sum}(1[y=i])} \quad (8)$$

where $k'_i$ represents a final category feature center of an i-th category, $k_i$ represents an initial category feature center of the i-th category, $\nabla$ represents a gradient, $\nabla k_i$ represents a gradient-optimized category feature center of the i-th category, j represents a number of unlabeled samples, l represents a number of labeled samples, $e_{j,l}$ represents a feature corresponding to the labeled samples and the unlabeled samples, sum( ) represents a sum of values in parentheses, $v_i$ represents a probability distribution feature center of the i-th category, $v_{i,j}$ represents probability distribution feature centers of the i-th category obtained by updating category probability vectors of j samples of the i-th category, n represents a total number of samples, C represents a number of categories in a dataset, e represents an initial feature vector, p represents a "time-space-spectrum-angle" feature vector, $P_{j,l}$ represents a prediction probability corresponding to the labeled samples of the l-th category and the unlabeled samples of the j-th category, η represents an update coefficient, and 1(y=i) represents an indicator function. In order to treat all categories equally, any prior experiences are not introduced, where $k_i$ is initialized to 0 and $v_i$ is initialized to 1/C.

The formula (5) represents the category feature center of the i-th category finally obtained based on the "time-space-spectrum-angle" attention model; the formula (6) represents a process of optimizing the category feature center of the i-th category based on gradient optimization; the formula (7) represents a calculation process of the probability feature center of the i-th category, from which a category feature is selected; and the formula (8) represents a statistics process of the "time-space-spectrum-angle" feature vectors of the samples, from which i probability feature vectors are selected.

Furthermore, in the disclosure, a regularizer is introduced to optimize the "time-space-spectrum-angle" feature parameters. As shown in FIG. 1, the regularizer represents a collective name for methods of introducing additional information to the original model to prevent overfitting resulting from insufficient training data or over-complex network structure. Information entropy represents expectation of all information amounts, which is a sum of results obtained by multiplying different possible result probabilities by their results in the test. Structural risk refers to constructing a function set into one function subset sequence such that the subsets are sorted in an order of size. A minimum empirical risk is sought in each subset, and empirical risk and confidence range are considered in a compromise way between subsets. The minimized cross entropy and structural risk are calculated using the regularizer, so as to minimize an anticipated learning loss, thereby obtaining feature parameters $W_{bi}$ of the optimized network.

In the few-shot urban remote sensing information extraction stage, the feature parameters $W_{ai}$ obtained by pre-training and the optimized "time-space-spectrum-angle" feature parameters $W_{bi}$ are used in parallel as feature parameters of the classifier, such that the classifier can retain the initial network features and will not forget knowledge learned by the optimized network. In this way, the urban remote sensing information extraction model designed in the disclosure will be fully adapted to the information features of a small number of samples.

The classifier learns a rule of information extraction based on the above feature parameters, and then extracts urban ground feature information from unknown data. In a classification task, cross entropy loss (also called log likelihood loss) function is usually used. In multiple classification tasks, combination of the soft max activation function and the cross entropy loss function is usually used where the cross entropy represents a distance between an actual output and a desired output. The smaller the cross entropy is, the closer the probability distributions of them is to each other. If the probability distribution p is a desired output and the probability distribution q is an actual output, H(p, q) is a cross entropy with the calculation formula as follows:

$$H(p, q) = -\sum_{j=1}^{T} p(x) \log q(x) \quad (9)$$

where T is a category number of classification, p(x) is a true probability of occurrence of an event, q(x) is a prediction probability of occurrence of an event, and j is a number of events.

In the disclosure, due to small and non-uniform samples, accuracy will be lowered. It is preferred to use Focal Loss function to replace Cross Entropy Loss function.

$$FL(p) = -a_t[1-p(x)]^\gamma \log p(x) \quad (10)$$

where $a_t$ is used to balance the number of samples, γ is a penalty item used to control digging for hard-to-separate samples.

Figure 3:
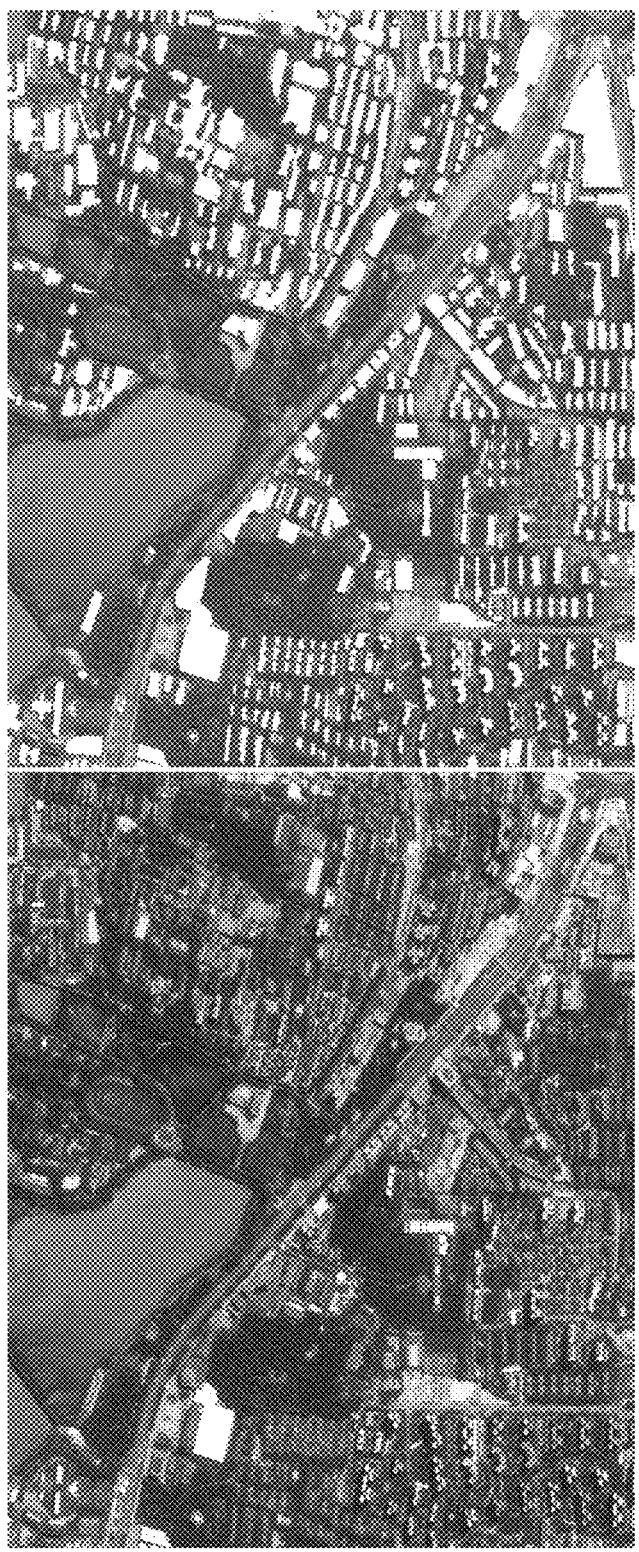
FIG. 3 is a result diagram of an embodiment of the disclosure.

Step 4, remote sensing image data with a full color resolution of 0.8 meters and a multi-spectral resolution of 3.2 meters is obtained by Gaofen No. 2 (GF-2) Satellite independently developed by China. By fusing full color images and multi-spectral images, multi-spectral images with a resolution of 0.8 meters are obtained. By using the method designed by the above three steps, urban ground feature information extraction is performed. With urban building extraction as an example, a fused high resolution image (left in FIG. 3) as a data source is slid and cropped using a window of 256×256 pixels to sample 80% of image blocks randomly to generate a training set for model training, and the remaining 20% of image blocks are used as a verification set to assess a model accuracy during model training. FIG. 3 shows a building extraction result. In an accuracy assessment stage, an entire accuracy, a manufacturer accuracy, a user accuracy and a Kappa coefficient are used accuracy indexes to measure the performance of the proposed method, where the entire accuracy reaches 98.31%, the manufacturer accuracy reaches 93.36%, the user accuracy reaches 99.82% and the Kappa coefficient reaches 0.9819.

In a specific implementation, the method proposed by the technical solution of the disclosure may be automatically run by those skilled in the art who use computer software technology. A system apparatus for implementing the method, such as a computer readable storage medium storing corresponding computer programs of the technical solution of the disclosure and a computer device comprising corresponding computer programs shall fall within the scope of protection of the disclosure.

In some possible embodiments, there is provided a few-shot urban remote sensing image information extraction system based on meta learning and attention, comprising a processor and a memory, wherein the memory is configured to store program instructions and the processor is configured to invoke the program instructions stored in the memory to perform the few-shot urban remote sensing image information extraction method based on meta learning and attention as mentioned above.

In some possible embodiments, there is provided a few-shot urban remote sensing image information extraction system based on meta learning and attention, comprising a readable storage medium, wherein the readable storage medium stores computer programs which are executed to perform the few-shot urban remote sensing image information extraction method based on meta learning and attention.

The specific embodiments described herein are used only to illustrate the spirit of the disclosure. Persons skilled in the art may make various modifications or supplementation to or make substitutions in similar way to the specific embodiments, and such modifications, or supplementations or substitutions still fall within the spirit or the disclosure or the scope defined by the appended claims.

What is claimed is:

1. A few-shot urban remote sensing image information extraction method based on meta learning and attention, the method comprising:

step 1, building a few-shot urban remote sensing information pre-trained model, wherein during a pre-training stage, pre-training network learning is performed for a few-shot set to fully learn feature information of existing samples and obtain initial feature parameters and a deep convolutional network backbone of the few-shot set; the few-shot urban remote sensing information pre-trained model is a network structure comprising a convolutional layer, a pooling layer and a fully-connected layer, and comprises five sections of convolutional network where each section comprises two or three convolutional layers, and an end of each section is connected to one maximum pooling layer to reduce a size of a picture; the number of convolutional kernels inside each section is same, and when closer to the fully-connected layer, the number of convolutional kernels is larger;

step 2, constructing a "time-space-spectrum-angle" attention model to enable the pre-training network to focus on important "time-space-spectrum-angle" information in a training process, suppress noise and redundant information, and improve classification performance of the pre-training model;

step 3, establishing a synergy mechanism of meta learning and attention and realizing few-shot urban remote sensing information extraction, performing parallel association learning for feature parameters obtained by the "time-space-spectrum-angle" attention model and initial feature parameters and introducing a regularizer to minimize cross entropy and structural risk and realize full digging for few-shot information; and step 4, obtaining remote sensing data through a satellite and fusing a full color image and a multi-spectral image to obtain a multi-spectral image, and using the above three steps to perform urban ground feature information extraction; wherein:

a feature vector of the "time-space-spectrum-angle" is obtained in the following formula:

$$k'_i \Leftarrow k_i - \eta \nabla k_i$$

$$\nabla k_i = \frac{\sum_{j=1}^{n} 1[y=i](k_i - e_{j,l})}{\text{sum}(1[y=i])}$$

$$v_i \Leftarrow \frac{v_i - \eta \nabla v_i}{\sum_{j=1}^{C}(v_{i,j} - \eta \nabla v_{i,j})}$$

$$\nabla v_i = \frac{\sum_{j=1}^{n} 1[y=i](v_i - p_{j,l})}{\text{sum}(1[y=i])}$$

wherein $k_i$ represents a final category feature center of an i-th category, $k_i$ represents an initial category feature center of the i-th category, $\nabla$ represents a gradient, $\nabla k_i$ represents a gradient-optimized category feature center of the i-th category, j represents a number of unlabeled samples, I represents a number of labeled samples, $e_{j,i}$ represents a feature corresponding to the labeled samples and the unlabeled samples, sum ( ) represents a sum of values in parentheses, $v_i$ represents a probability distribution feature center of the i-th category, $v_{i,j}$ represents probability distribution feature centers of the i-th category obtained by updating category probability vectors of j samples of the i-th category, n represents a total number of samples, C represents a number of categories in a dataset, e represents an initial feature vector, p represents a "time-space-spectrum-angle" feature vector, $P_{j,l}$ represents a prediction probability corresponding to the labeled samples of the l-th category and the unlabeled samples of the j-th category, $n$ represents an update coefficient, and 1(y=i) represents an indicator function.

2. The method of claim 1, wherein the five sections of convolutional network in the few-shot urban remote sensing information pre-trained model is implemented as follows:

a first section of convolutional network comprises two convolutional layers and one maximum pooling layer, with an output channel number being 64 and an output size being 112×112×64;

a second section of convolutional network comprises two convolutional layers and one maximum pooling layer, with an output channel number being 128 and an output size being 56×56×128;

a third section of convolutional network comprises three convolutional layers and one maximum pooling layer, with an output channel number being 256 and an output size being 28×28×256;

a fourth section of convolutional network comprises three convolutional layers and one maximum pooling layer, with an output channel number being 512 and an output size being 14×14×512;

a fifth section of convolutional network comprises three convolutional layers and one maximum pooling layer, with an output channel number being 512 and an output size being 7×7×512;

wherein results output by the five sections of convolutional network are represented as one-dimensional vector in a flattened manner and then input into a Dropout layer corresponding to a first fully-connected layer and then input into a Dropout layer corresponding to a second fully-connected layer and finally input into a third fully-connected layer, wherein an output node of the third fully-connected layer is 1000; and the third fully-connected layer obtains a classification output probability and a classification result by using softmax function at the same time.

3. The method of claim 1, wherein in the "time-space-spectrum-angle" attention model, for a three-dimensional input X, two feature-compressed global feature descriptions are obtained firstly through maximum pooling and average pooling along a channel dimension; then, by a gate mechanism of hard-sigmoid, a weight Xss € (0,1) of a temporal feature, a spatial feature, a spectral feature and an angular feature is obtained; finally, the original input X is multiplied by the weight Xss;

continuous learning is performed by the network in a training process, and a weight corresponding to the important "time-space-spectrum-angle" information approaches 1; and a weight corresponding to non-important or negative noise and redundant information approaches 0.

4. A few-shot urban remote sensing image information extraction system based on meta learning and attention, comprising a processor and a memory, wherein the memory is configured to store program instructions and the processor is configured to invoke the program instructions stored in the memory to perform the few-shot urban remote sensing image information extraction method based on meta learning and attention of claim 1.

5. A few-shot urban remote sensing image information extraction system based on meta learning and attention, comprising a non-transitory computer-readable storage medium, wherein the non-transitory computer-readable storage medium stores computer programs which are executed to perform the few-shot urban remote sensing image information extraction method based on meta learning and attention of claim 1.

* * * * *